US005106663A

United States Patent [19]

Box

[11] Patent Number: 5,106,663

[45] Date of Patent: Apr. 21, 1992

[54] DOUBLE-PANED WINDOW SYSTEM HAVING CONTROLLED SEALANT THICKNESS

[75] Inventor: James A. Box, Broadview Heights, Ohio

[73] Assignee: Tremco Incorporated, Cleveland, Ohio

[21] Appl. No.: 320,030

[22] Filed: Mar. 7, 1989

[51] Int. Cl.[5] .......................... E06B 3/24; C03C 27/00

[52] U.S. Cl. ...................................... 428/34; 428/192; 428/402; 156/109; 52/788; 52/790

[58] Field of Search ..................... 428/34, 192, 402.24, 428/402; 156/107, 109; 52/171, 172, 788, 789, 790

[56] References Cited

U.S. PATENT DOCUMENTS 4,683,154 7/1987 Benson et al. .......................... 428/34

4,720,950 1/1988 Boyer et al. ............................ 52/172

*Primary Examiner*—Ellis P. Robinson

*Assistant Examiner*—Donald J. Loney

*Attorney, Agent, or Firm*—Konrad H. Kaeding

[57] ABSTRACT

The present invention relates generally to multi-paned window systems and to the manufacture of such systems. More specifically, the present invention is directed to an improved window system having an innovative seal comprising crush resistant beads or the like wherein the seal can be compressed only to a substantially uniform and substantially predefined thickness and wherein the seal provides exceptional insulation, weather resistance and adhesion characteristics.

6 Claims, 1 Drawing Sheet

DOUBLE-PANED WINDOW SYSTEM HAVING CONTROLLED SEALANT THICKNESS

BACKGROUND OF THE INVENTION

1. Field of the Invention

This invention relates generally to multi-paned window systems and to the manufacture of such systems. More specifically, the present invention is directed to an improved window system having an innovative seal wherein the seal can be compressed only to a substantially uniform and substantially predefined thickness and wherein the seal provides exceptional insulation, weather resistance and adhesion characteristics.

2. Discussion of the Prior Art

Multi-paned window systems are known generally in the art, and such systems have two or more window panes encased in a window frame by means of a seal, typically a mastic-type product. Conventional mastics are generally thick, semi-liquid polymer sealants which are typically dispensed by means of a caulking gun or similar-type device; alternatively such sealants can sometimes be thickened and incorporated into a preformed tape and applied by hand.

The mastic will bond the sheets of glass together along their peripheral edges in a spaced apart relationship to thereby provide an air space between the glass plates. The sealed air space provides the window system with superior insulating qualities relative to conventional single-paned systems.

However, the flowable nature of many mastics during the manufacturing process often presents handling problems and can also result in undesirable migration of the polymer material. It may be difficult to obtain a uniform thickness of the mastic due to the mastic's semi-liquid nature. Although uniform thickness may initially be achieved, the glass panes may nevertheless shift and the mastic compressed or otherwise moved in a non-uniform manner. Such unwanted shifting and non-uniform mastic compression can be particularly pronounced if the window systems are stacked one on top of the other during the manufacturing process. Such stacking however is commonplace due primarily to space limitations and labor cost considerations.

If the window systems are stacked during manufacture, not only will each window tend to have a non-uniform seal around its periphery due to non-uniform stacking compression, but also the window systems at the bottom of the pile will tend to deform and be compressed more than windows located at the top. As a result, the gap between the glass panes of each window system will generally be non-uniform and somewhat unpredictable.

Similar-type extreme and/or non-uniform compression forces can occur in window systems having a crank mechanism used to pivot the window open or closed. Such cranking systems often place significant strain on the window system and typically cause substantial compression upon the window sealant.

Extreme and/or non-uniform compression forces can also occur if the multi-paned window system is used in an automobile or similar-type vehicle. Such forces can also occur if the sash is of a low cost, high compression design, such as where the sash framework must be partially pried open and pounded onto the periphery of the multi-paned window system to provide a tight friction fit without the need for a substantial amount of glazing or the like.

Non-uniform mastic compression can detract from the appearance of the window and can adversely effect the mastic's ability to bond, seal, and be weather resistant. If compression forces overly compress the mastic, such compression will reduce the mastic's ability to elongate or tolerate movement. Furthermore, a particularly soft or flowable mastic may be substantially squeezed out of the window system, substantially diminishing or destroying the intended seal.

OBJECTS OF THE INVENTION

It is therefore an object of the present invention to provide an improved multi-pane window system having a reliable seal which will compress only to a predefined, uniform thickness.

It is a further object of the present invention to provide a window system having exceptional sealing and insulating properties, regardless of any stacking or similar-type stress placed on the system.

Other objects and features of the present invention will be apparent to those of ordinary skill in the art upon further reading of the following specification and claims.

SUMMARY OF THE INVENTION

The present invention is directed to an improved window system having an innovative seal which can be compressed only to a substantially uniform and substantially predefined thickness and which provides exceptional insulation, weather resistance and adhesion characteristics. The improved multi-paned window system comprises:

a first and a second pane in a closely spaced apart, substantially parallel, overlapping relationship each pane having an inner surface facing the other;

a seal between and in contacting relationship with said panes along the periphery of the inner surfaces of said panes;

said seal comprising a spacer member and a bonding material;

said bonding material adhering the inner peripheral surfaces of said panes to said spacer;

said bonding material comprising about 0.5% to about 50% by weight crush-resistant beads intermixed within said bonding material, said beads having a size range of about 0.2 to about 0.001 inches (about 5.02 to about 0.0256 millimeters); and a frame enclosing the periphery of the panes.

DETAILED DESCRIPTION OF THE PREFERRED EMBODIMENT

Figure 1:
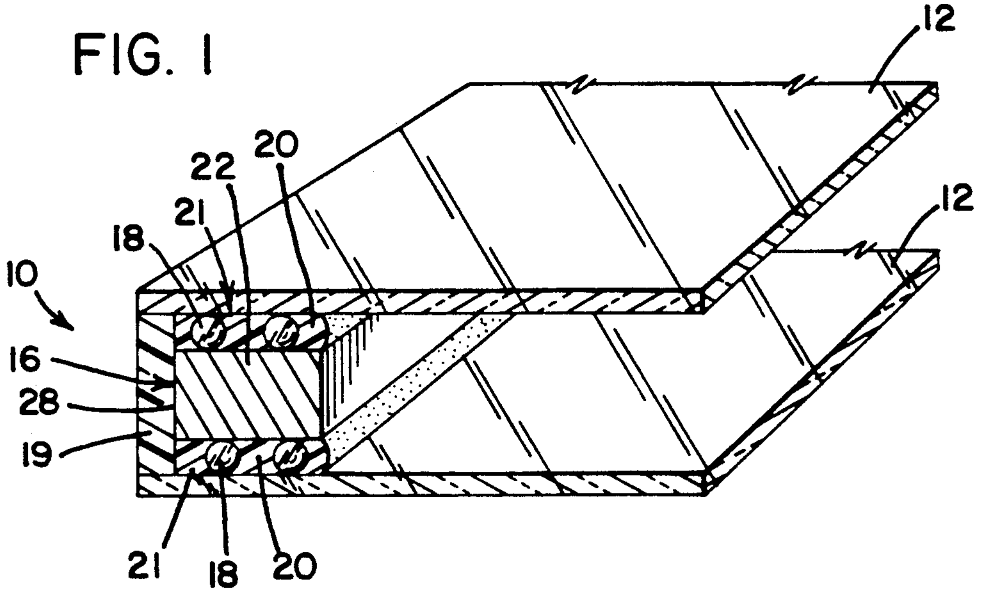

The preferred window system of the present invention is illustrated generally at 10 in FIG. 1. As can be seen in this figure, glass panes 12 are separated by seal 16 which comprises beads 18, inner bonding material 20 and spacer 22. Outer bonding material 19 aids in sealing and bonding panes 12 together.

Inner bonding material 20 is preferably a blend of about 55%-85% polyisobutylene ("PIB") and about 15%-45% carbon black. The PIB substantially provides needed tackiness, sealing and adhesion properties, and the carbon black provides a screen against ultra-violet radiation (which can degrade PIB over time) and also provides thickening and reinforcement properties. Alternatively the bonding material can be any substance which provides low moisture vapor transmission ("MVT"), and is thick, tacky, durable, weather resistant and sufficiently elastomeric to maintain an appropriate bond or seal between spacer 22 and glass panes 12. Suitable such substances would include polyisobutylene, cold butyl (butyl having appropriate compounding resins to provide a pressure sensitive adhesive), hot melt butyl (butyl having appropriate compounding resins to provide an adhesive having a predictable softening point—typically about 350° F.), copolymers, and mixtures thereof; no reason is perceived why any particular material should be critical to performance of this invention, provided of course that the material provides an adequate level of adhesion to glass, has low MVT, is sufficiently elastomeric, durable, weather resistant and the like. Thus the selection of bonding material 20 is deemed to be a matter of choice and within the area of ordinary skill and routine experimentation.

For example, polysulfides, polyurethanes, silicones, polymercaptans, copolymers and mixtures thereof could also be used as bonding material 20, but are less preferred because they must be cured. Prior to curing, such substances must typically be handled carefully, since impurities, contaminants and sometimes even humidity or oxygen often cause curable materials to cure prematurely or alternatively prevent them from curing at all. Furthermore, once applied and allowed to cure, the cured material will generally not re-seal to a surface, once it is pulled away from that surface.

Non-curing substances, such as those discussed above are much easier to handle and use, since they will generally maintain their soft, thick and sticky character, often even in the presence of oxygen, humidity, impurities or contaminants. Furthermore, the non-curing substances will generally re-seal to a surface if applied to and later pulled away from a surface. The non-curing substances are often less costly and generally less labor intensive to apply (and more forgiving if initially mis-applied).

If a curing system is nevertheless chosen, a wide variety of curing systems can be used, provided the polymeric material is able to cure at the appropriate time. The polymeric material generally must stay in its uncured state until it is effectively applied to the window system and the entire window system is effectively assembled. After assembly, the polymeric material should cure quickly. An appropriate curing system can be determined by ordinary experimentation using ordinary skill.

Certain additives may sometimes be necessary to create the final bonding material 20 and can provide desired physical properties. The polymeric material 20 must be easy to handle and apply and is preferably soft, thick, and tacky. Additives, such as adhesion enhancers, plasticizers, dyes (or pigment additives such as titanium dioxide), desiccants, etc., are known in the art and may advantageously be incorporated where functionality is desired, provided only that they do not interfere with the functioning of the bonding material 20 for its intended purpose. This of course can be determined by simple experimentation using ordinary skill.

If a desiccant filler is used, the necessary amount of such desiccant can generally be more easily determined than in many conventional systems, since the window air space is generally more predictable. Furthermore, the desiccant will generally perform much better, since it is uniformly spaced around the periphery of the air space.

It has been found that the inclusion of glass or similar-type beads 18 as a generality results in improved sealing and compression properties compared to the same composition in which a equivalent volume of other filler (such as kaolin) is used in place of the beads. The beads will prevent bonding material 20 from being squeezed out from between spacer 22 and pane 12. The beads therefore prevent seal failure due to a lack of bonding material between the pane and spacer and also prevent an unsightly oozing of the bonding material 20 onto pane 12, away from spacer 22. The beads ensure that the bonding material cannot be compressed beyond a distance substantially equal to the diameter of the beads, and furthermore the beads provide a barrier which hinders the bonding material from oozing out from the spacer-window pane gap.

Without beads 18, compression forces could flatten bonding material 20 to such an extent as to reduce the sealing material's ability to elongate or accommodate movement. Without the requisite elasticity, the bonding material will be prone to failure. It has been found that if the bonding material is compressed to a few thousandths of an inch (a few thousandths of 2.56 centimeters), the bonding material generally will not have sufficient elasticity for most window applications.

The beads 18 must be crush resistant, that is to say, they must have sufficient strength to resist any risk of crushing due to compression forces placed upon the beads during normal use of the window system. The beads can be hollow, provided the walls are sufficiently strong to resist crushing. The beads may be oval in shape, but preferably are substantially spherical. The particle size range of the beads is generally about 0.2 to about 0.001 inches (about 5.12 to about 0.0256 millimeters). The most preferred particle size is generally about 0.1 to about 0.01 inches (about 2.56 to about 0.256 millimeters), most preferably about 0.012 inches (0.3 millimeters), with best results generally achieved where the beads are substantially uniform in size.

The glass beads 18 are preferably formed of soda glass, most preferably of "A" type glass. The beads have preferably been made by solidification of molten glass droplets and may have been treated by a fire polishing process in conventional manner. The surface may be untreated, i.e. in the form obtained by fire polishing, or they may have been given a surface coating of a variety of materials provided the surface coating does not interact with other components in the composition in such a way as to reduce significantly the sealing properties of the composition. The glass beads preferably should have a MOH hardness of about 6, since normal glass generally cannot be scratched by anything having a MOH hardness less than about 7.

The amount of glass beads 18 in the composition should be sufficient to give an improvement, and it is usually about 5% by weight and generally the amount is below about 50%. Typically, the amount will be between about 0.5% and about 13% by weight.

After the bonding material 20 is intermixed with glass beads 18, a ribbon 21 of the resulting mixture is preferably positioned along two opposite sides of a spacer member 22 as shown in FIG. 1. The spacer member can be any inert, solid material and is preferably aluminum, although galvanized steel or rigid plastic might also be used, depending upon the stress to be placed upon the window system. Very large window systems or window systems for use in a train, boat or the like will typically require a stronger, more rigid spacer (such as galvanized steel), while conventional residential windows may only require a rigid plastic spacer.

The spacer member is preferably sufficiently long to encompass a periphery of the pane. The spacer height (perpendicular to the panes) is preferably about 3/16ths to about 1 inch (about 4.8 to about 25.6 millimeters), with the upper and lower limits being determined by the design of the sash and by the air space requirement between the panes. For purposes of insulation, an air space greater than about $\frac{5}{8}$th of an inch (15.9 millimeters), will generally allow air currents within the air space which can act as a heat exchanger, thereby diminishing the insulation value of the window system. An air space significantly less than $\frac{1}{4}$th inch will also generally provide less insulation value. The framing around the window system (or sash) can be of any one of a number of designs which may or may not require a certain sized spacer member.

The spacer width is preferably about 3/16ths to about 2 inches (about 4.8 to about 51.2 millimeters) with the lower limit generally dependent upon the sash design to be used and the upper limit being generally dependant upon the temperature gradient tolerance of the glass. If the width is too great, the resulting seal along the edge of the pane will generally have sufficient insulation properties to create a temperature gradient between the edge of the pane (on the one side of the seal) and the rest of the glass on the other side of the seal. If the glass cannot tolerate the temperature gradient, it may crack.

The appropriate thickness of ribbon 21 and dimensions of spacer 22 can be determined by ordinary experimentation. The thickness of the ribbon should not be so narrow as to inhibit necessary elongation (required due to compression and expansion forces occurring during normal use of the window system) and not so thick as to allow undue transmission of water vapor. Water vapor will cause unwanted condensation and fogging if it accumulates within the sealed space between the glass panes. Generally, water vapor cannot permeate glass or the glass beads, and therefore the principal means for water permeation is through the bonding material. The thicker the ribbon of bonding material, the greater the potential for water vapor permeation. It has generally been found that the ribbon 21 is preferably about 0.1 to about 0.01 inches (about 2.56 to about 0.256 millimeters) thick.

The resulting coated spacer can be manufactured using conventional equipment, wherein the bonding material 20 (containing beads 18) is extruded onto opposite sides of a passing spacer member. Thereafter the manufacturer can apply the coated spacer by hand (or machine) along the periphery of a single pane of glass or the like, wherein each side of the spacer having a ribbon of bonding material is placed in contacting relationship with the opposing panes in a manner suggested by FIG. 1.

Figure 2:
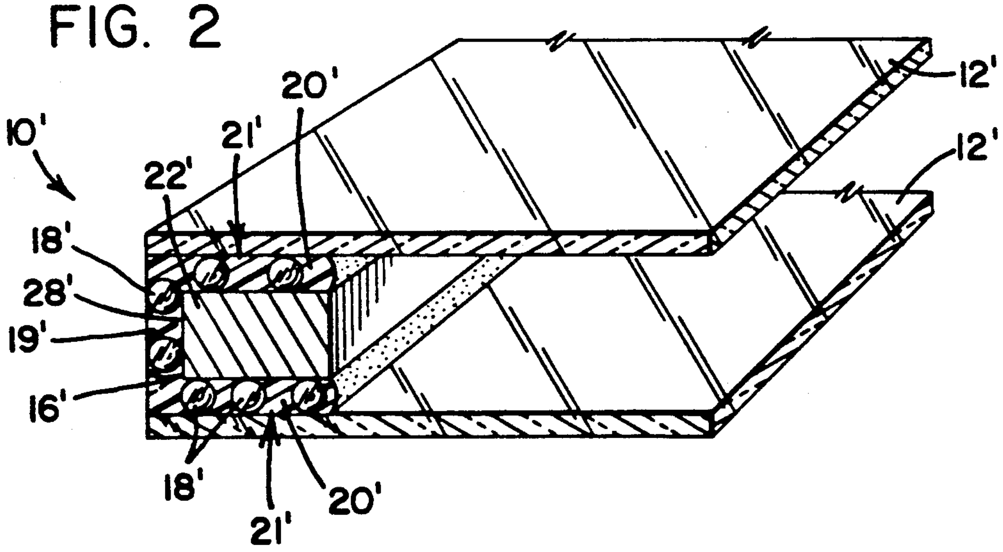

Regarding the outer side edge 28 of spacer 22, this edge, and panes 12 can be sealed by outer bonding material 19, such as is suggested in FIGS. 1 and 2. Outer bonding material 19 generally need not contain beads (the beads are substantially unnecessary due to the relatively small compression or expansion forces typically exerted on outer edge 28). FIG. 1 shows outer bonding material 19 without beads, and FIG. 2 shows an outer bonding material 19' having beads. Bonding material 19 or 19' can be substantially the same as bonding material 20 or can be different. The bonding material 19 or 19' can be any of a large number of suitable bonding materials, both curable and non-curable, provided the resulting seal provides an appropriate bond and seal between the window panes. Suitable such bonding materials can be easily determined by ordinary experimentation using ordinary skill.

Bonding material 19 or 19' can be applied at the same time as bonding material 20 is applied, or it can be applied at a later time. The width of the material (parallel to the panes) is preferably about $\frac{1}{8}$th to about $\frac{1}{2}$ of an inch (3.2 to about 12.8 millimeters), depending upon the sash to be used and temperature gradient tolerance of the pane (see discussion above relating to spacer width and temperature gradient tolerance). The height of bonding material 19 or 19' is primarily dependant upon the air gap required and the bonding strength of the material. The window frame can be made from wood or metal and can be of virtually any design commonly used in the industry.

During manufacture, the weight of the upper glass pane will generally compress the bonding material, as will any stacking of the finished units or any similar-type compression forces. However, the ribbon 21 will compress to a maximum of about the average diameter of the beads between the spacer and pane.

The bonding material has been found to provide effective bonding and sealing properties even where the glass beads are tightly squeezed between a glass pane 12 and the spacer 22. The gap between the panes of glass are therefore substantially uniform and the seal is sufficiently resilient and reliable. Furthermore, the seal has been found to be very reliable, and the bonding material 20 will strongly resist being squeezed out from between the panes or otherwise moved to an undesirable location between the panes.

The seal 16 (comprising spacer 22, inner bonding material 20 and beads 18) is easy to use, easy to manufacture, safe, convenient and reliable. The resulting window system is typically less labor intensive than other known systems, and the final product is more uniform. The sealing and bonding properties have been found to be exceptional and customer enthusiasm has been extremely encouraging.

The above discussion has been provided to aid in the understanding of the present invention. Details provided above are provided primarily to help the ordinary artisan visualize the preferred embodiment and the innumerable other possible embodiments of this invention, and such details are not intended to create any limitations to this invention. Many improvements and modifications are certainly possible and it would be impossible to explicitly describe every conceivable aspect of the present invention. Therefore, the failure to describe any such aspect is also not intended to create any limitation to the present invention. The limitations of the present invention are defined exclusively in the following claims and nothing within this specification is intended to provide any further limitation thereto.

What is claimed is:

1. An improved multi-paned window system, said system comprising:

a first and a second pane in a closely spaced apart, substantially parallel, overlapping relationship, each pane having an inner surface facing the other;

a seal between and in contacting relationship with said panes along the periphery of the inner surfaces of said panes; a frame member substantially enclosing the periphery of the panes;

said seal comprising a first bonding material and a substantially rigid spacer member, said spacer member having an upper, lower, inner and outer surface;

said first bonding material adhering the inner peripheral surfaces of said panes to said spacer, wherein the first pane is adhered to the upper surface of said spacer and the second pane is adhered to the lower surface of said spacer;

said first bonding material comprising about 0.5% to about 50% by weight crush-resistant substantially rigid beads intermixed within said bonding material, said beads having a size range of about 0.2 to about 0.001 inches (about 5.12 to about 0.0256 millimeters).

2. The window system of claim 1 wherein the beads are substantially uniform in size and have a size range of about 0.1 to about 0.01 inches (about 2.56 to about 0.256 millimeters).

3. The window system of claim 2 wherein the thickness of the first bonding material is about 0.1 to about 0.01 inches (about 2.56 to about 0.256 millimeters).

4. The window system of claim 3 further comprising a second bonding material, the same as or different from said first bonding material, said second bonding material in substantial proximity to the outer surface of said spacer and providing a seal between said panes.

5. A method of manufacturing a window system, said method comprising:

a first and a second pane in a closely spaced apart, substantially parallel, overlapping relationship, each pane having an inner surface facing the other;

a seal between and in contacting relationship with said panes along the periphery of the inner surfaces of said panes; a frame member substantially enclosing the periphery of the panes;

said seal comprising a first bonding material and a substantially rigid spacer member, said spacer member having an upper, lower, inner and outer surface;

said first bonding material adhering the inner peripheral surfaces of said panes to said spacer, wherein the first pane is adhered to the upper surface of said spacer and the second pane is adhered to the lower surface of said spacer;

said first bonding material comprising about 0.5% to about 50% by weight crush-resistant substantially rigid beads intermixed within said bonding material, said beads having a size range of about 0.2 to about 0.001 inches (about 5.12 to about 0.0256 millimeters).

6. The method of claim 5 further comprising:

applying a second bonding material, the same as or different from said first bonding material, in substantial proximity to the outer surface of said spacer and in contacting relationship with said panes to thereby provide a seal between said panes.

* * * * *